(No Model.) 9 Sheets—Sheet 1.
G. J. ALTHAM.
OIL ENGINE.

No. 564,576. Patented July 21, 1896.

WITNESSES
INVENTOR:
Geo. J. Altham (No Model.) 9 Sheets—Sheet 3.

G. J. ALTHAM.
OIL ENGINE.

No. 564,576. Patented July 21, 1896.

WITNESSES:
A. D. Harrison.
A. D. Adams.

INVENTOR:
Geo. J. Altham
by Wright Brown & Quinby
attys.

(No Model.) 9 Sheets—Sheet 4.
G. J. ALTHAM.
OIL ENGINE.

No. 564,576. Patented July 21, 1896.

FIG 6.

WITNESSES:
A. D. Harrison.
A. D. Adams.

INVENTOR:
Geo. J. Altham
by Knight Brown & Quinby
Attys.

(No Model.)

G. J. ALTHAM.
OIL ENGINE.

Patented July 21, 1896.

FIG. 7.

WITNESSES:
A. D. Harrison.
A. D. Adams.

INVENTOR:
Geo. J. Altham
by
Wright Brown & Quinby
Attys.

(No Model.) G. J. ALTHAM. 9 Sheets—Sheet 7.
OIL ENGINE.

No. 564,576. Patented July 21, 1896.

(No Model.) 9 Sheets—Sheet 8.

G. J. ALTHAM.
OIL ENGINE.

No. 564,576. Patented July 21, 1896.

WITNESSES:
A. J. Harrison.
A. J. Adams.

INVENTOR:
Geo. J. Altham
by Wright Brown & Quinby
attys.

(No Model.) 9 Sheets—Sheet 9.

G. J. ALTHAM.
OIL ENGINE.

No. 564,576. Patented July 21, 1896.

WITNESSES:
A. J. Harrison.
A. D. Adams.

INVENTOR
Geo. J. Altham
by Wright, Brown & Quinby
Attys.

THE NORRIS PETERS CO., PHOTO-LITHO., WASHINGTON, D. C.

UNITED STATES PATENT OFFICE.

GEORGE J. ALTHAM, OF SWANSEA, MASSACHUSETTS.

OIL-ENGINE.

SPECIFICATION forming part of Letters Patent No. 564,576, dated July 21, 1896.

Application filed January 25, 1896. Serial No. 576,771. (No model.)

*To all whom it may concern:*

Be it known that I, GEORGE J. ALTHAM, of Swansea, in the county of Bristol and State of Massachusetts, have invented certain new and useful Improvements in Oil-Engines, of which the following is a specification.

This invention relates to oil-engines of the four-cycle type, in which the piston is given an impulse by the explosion of a mixture of oil-vapor and air, hereinafter termed the "working agent," during every alternate forward movement.

The invention has for its object to provide a simple engine of this class, capable of operating without the use of water as the cylinder-cooling agent, and adapted to operate rapidly without liability of premature explosions of the working agent; and to this end the invention consists, among other things, in an oil-engine comprising a cylinder, a piston working therein, two independent air-supplying agencies, communicating with the front end of the cylinder, one of said agencies including a vaporizing-chamber, in which the air becomes a part of the working agent, while the other includes a source of supply of pure atmospheric air, which cleanses and cools the cylinder after its working stroke, the pure-air supply entering after the explosive wave has passed and before the next charge of the working agent is admitted, and sweeping from the cylinder all the products of combustion, so that no incandescent particles are allowed to remain in the cylinder.

Of the accompanying drawings.

The same letters of reference indicate the same parts in all of the figures.

Referring to Figs. 1, 2, 3, and 4, $a$ represents a cylinder, and $b$ a piston working back and forth therein.

$c$ represents the shaft, which is driven by the piston through the connecting-rod $d$, which is jointed to the piston at one end, its other end embracing the crank $c'$ on the shaft.

Figure 2:
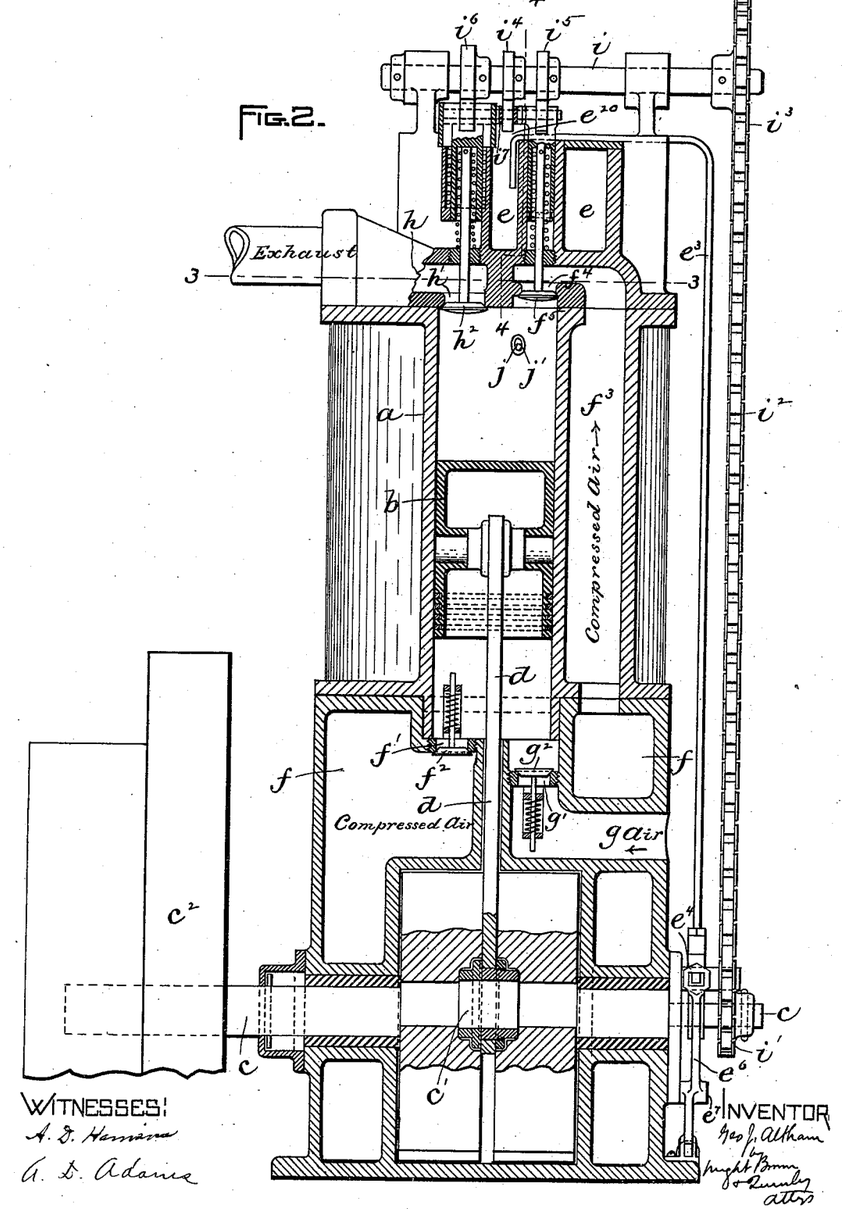
Fig. 2 represents a section on line 2 2 of Fig. 1.

$e$ is a vaporizing-chamber, which has a continuously-open air-inlet $e^{20}$, Fig. 2, through which external air enters the chamber and mingles therein with the hydrocarbon vapor to form an explosive mixture or working agent. The vaporizing-chamber communicates with one end of the cylinder through a port $e'$ controlled by a valve $e^2$, Figs. 3 and 4, and receives oil through a pipe $e^3$ supplied by a pump $e^4$, which may be operated by any suitable means. As here shown, the pump is operated by a cam $e^5$ on the shaft $c$, a lever $e^6$ pivoted at $e^7$ to a fixed support, said lever being connected with the plunger-rod $e^8$ of the pump, and a spring $e^9$, which holds the lever $e^6$ against the cam $e^5$, so that the lever is oscillated when the shaft $c$ is in motion. The oil is drawn to the pump from a reservoir (not shown) through a pipe $e^{90}$, and is vaporized in the chamber $e$ by the heat generated in the cylinder by the combustion of the mixture or working agent in the cylinder, as hereinafter described.

For convenience, I will term the end of the cylinder which receives the working agent the "front end," and the other the "rear end." The movement of the piston from the front to the rear end is termed the "forward stroke," while the opposite movement is termed the "return stroke," each forward stroke following an explosion being termed a "working stroke."

$f$ represents an air-chamber which communicates with the rear end of the cylinder through a port or inlet $f'$, controlled by a valve $f^2$, and with the front end of the cylinder through a passage or outlet $f^3$ and port $f^4$, the latter being controlled by a valve $f^5$.

$g$ represents a passage communicating with the external air and communicating with the rear end of the cylinder through a port $g'$, controlled by a valve $g^2$.

$h$ represents an exhaust-passage communicating at one end through a port $h'$ with the front end of the cylinder, and at its other end with the external air, the port $h'$ being controlled by a valve $h^2$.

The valves $e^2$, $f^5$, and $h^2$ controlling the ports at the front end of the cylinder are closed by springs, and are opened by cams $i^4$ $i^5$ $i^6$ on a shaft $i$, which is rotated by power imparted from the driving-shaft through suitable connections, such as sprocket-wheels $i'$ $i^3$ and a sprocket-chain $i^2$. The cam $i^4$ acts on the valve $e^2$ through a lever $i^7$, Fig. 4, connected with the stem of the valve $e^2$, while the cams $i^5$ and $i^6$ act directly, the one on the stem of the valve $f^5$ and the other on the stem of the valve $h^2$. The closing springs of said valves force the stems upwardly and hold trundle-rolls on said stems and on the lever $i^7$ in yielding contact with the cams. The valve $f^2$ at the rear end of the piston is arranged to open outwardly, while the valve $g^2$ opens inwardly, each of said valves being normally closed by a spring. $j$ $j'$ represent two electrodes, projecting into the front end of the cylinder and forming parts of an electric circuit which includes the wires $j^2$ $j^3$, Fig. 5, and a suitable source of electricity. Said circuit is provided with suitable means for producing a spark between the electrodes at predetermined periods, the spark exploding a charge of the working agent in the front end of the cylinder.

The operation is as follows: The piston being at the end of its return stroke and the front end of the cylinder charged with the working agent, the charge is ignited or exploded by an electric spark at the electrodes $j$ $j$ and the piston given a working stroke, which compresses the air in the rear end of the cylinder and forces it through the port $f'$ into the chamber $f$, the valve $f^2$ yielding to the displaced air, while the valve $g^2$ remains closed. Just before the end of the working stroke the exhaust-valve $h^2$ is opened to relieve the pressure of the gaseous products of combustion in the front end of the cylinder prior to the return stroke of the piston, the gases being thus afforded an outlet to the atmosphere through the exhaust-passage $h$. The air-valve $f^5$ is opened immediately after the opening of the exhaust-valve and just before the return stroke of the piston, and admits a blast of compressed air which is under an effective cylinder-cleansing pressure from the chamber $f$ to the front end of the cylinder through the port $f^4$. The port $f^4$ is somewhat higher than the exhaust-port and communicates with a recess in the front end of the cylinder, the walls of which guide the compressed air downwardly into the cylinder. The two ports are near opposite sides of the cylinder, so that the compressed air passes inwardly along one side of the cylinder and outwardly along the opposite side, thus gaining access to all parts containing the gaseous products of combustion and forcing the same out through the exhaust-port and cooling, besides cleansing, the cylinder. This cleansing and cooling movement of air in the cylinder continues during the return stroke of the piston, leaving nothing but pure air therein, and during that stroke air is drawn into the rear end of the cylinder through the passage $g$ and port $g'$, the valve $g^2$ opening inwardly and admitting the air, so that at the close of the return stroke the rear end of the cylinder contains a charge of air which is ready to be compressed by the next forward stroke of the piston. When the piston reaches the front end of the cylinder, the valves $f^5$ and $h^2$ are closed and the valve $e^2$ is opened, connecting the front end of the cylinder with the vaporizing-chamber. The next forward stroke of the piston now takes place (this being caused by the momentum of the engine, instead of being a working stroke) and forces the charge of air in the rear end of the cylinder into the chamber $f$, and at the same time draws a charge of the working agent into the front end of the cylinder, the working agent being under atmospheric pressure, so that it continues to enter until the end of the forward stroke. The valve $e^2$ is then closed and the piston makes its next return stroke, during which the valves $e^2$, $f^5$, and $h^2$ remain closed, so that the working agent is compressed in the front end of the cylinder, the piston drawing air into the rear end of the cylinder, through the passage $g$ and port $g'$, as before. At the end of this return stroke the compressed working agent is ignited by a spark, and the piston receives another working stroke. It will be seen, therefore, that a working stroke or impulse occurs during every alternate rotation of the shaft, and that pure air is compressed and stored by each forward stroke to be admitted into the front end or combustion section of the cylinder after each working stroke, and that each return stroke prepares a fresh charge of air to be compressed by the next forward stroke. By thus storing compressed air during two forward strokes of the piston, the air being confined in the storage-chamber after each forward stroke caused by momentum, and admitted to the front end of the cylinder after each working stroke, I insure the thorough cleansing of the combustion section of the cylinder, all the products of combustion being swept out, and nothing but pure air left in the cylinder when the next charge of the working agent is admitted. By thus sweeping or washing out the combustion-section, and filling it with pure air prior to the admission of the working agent, I prevent the presence of particles of incandescent carbon in the cylinder and the liability of a premature explosion during the admission of the next charge of the working agent, and avoid the necessity of using water to cool the cylinder, and enable the working strokes to follow each other in more rapid succession than would otherwise be possible, the thorough cleansing of the cylinder enabling it to remain at a higher temperature than would be safe if it were not thus cleansed. I also obtain a very energetic explosion, the explosive wave passing with great rapidity through the combustion-section.

An important feature, and in fact the chief characteristic, of my invention is the two independent air supplies, one as a part of the working agent through the continuously open air-inlet $e^{20}$ and the vaporizing-chamber, and the other as a cleansing and cooling agent through the air-storage chamber, the said cleansing and cooling agent being pure air and having no function excepting to cleanse and cool the combustion-section of the cylinder, it being admitted to the cylinder only after the explosive wave has expended its force. By thus dividing the air supplied to the engine into two parts, each having an independent function, I am enabled to materially simplify the construction, all the air being supplied by the action of one piston, which draws air from one source of supply accompanied by the oil-vapor as the working agent into the front end of the cylinder, thereby inducing a flow of air into the vaporizing-chamber, draws air for the cleansing and cooling supply into the rear end of the cylinder, and compresses the said supply in the storage-chamber, a very large supply of air being furnished. By dispensing with water as a cooling agent I greatly increase the efficiency of the engine, it being well known that a water-jacket cools the cylinder to such an extent as to impair the efficiency of the engine.

Figure 5:
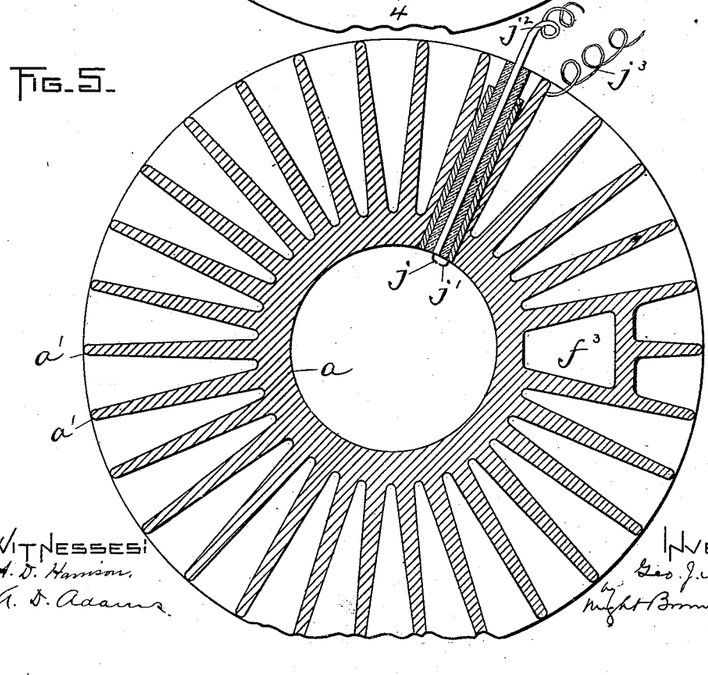
Fig. 5 represents a section on line 5 5 of Fig. 1.

The exterior of the cylinder is preferably provided with a series of radiating ribs $a'$, Fig. 5, to increase its surface area and facilitate the radiation of heat therefrom, to the end that the temperature of the cylinder may be kept as low as possible.

In Figs. 6 to 11, inclusive, I show an alternative construction, which differs from that above described in certain particulars, and particularly as to the valves which control the admission of air into the storage-chamber $f$ during each forward stroke, and into the rear end of the cylinder during each return stroke, said alternative construction being preferred by me as being more positive and reliable, although I have given the other construction precedence in the description, because its simplicity is such that it enables the operation to be more readily understood.

In the alternative construction, instead of employing air-controlling valves $f^2$ and $g^2$, which are closed by springs and are opened by air-pressure, I provide the means next described for positively opening and closing the ports or passages, through which air enters the storage-chamber $f$ and the rear end of the cylinder.

Figure 7:
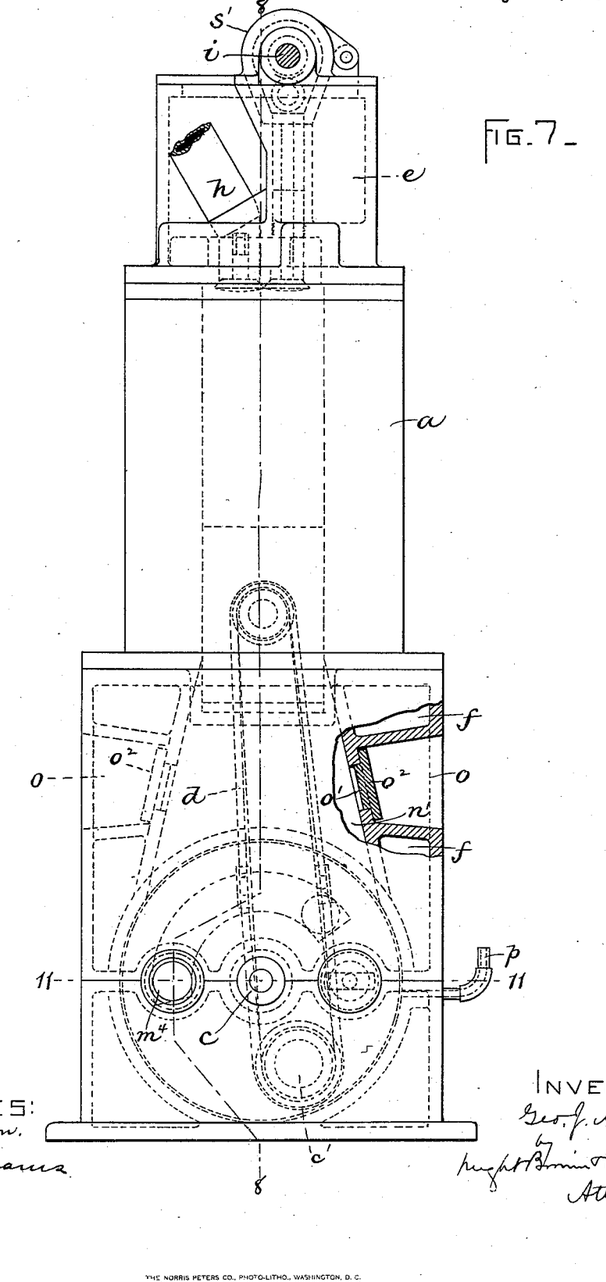
Fig. 7 represents a side view of the cams shown in Fig. 6.
Figure 8:
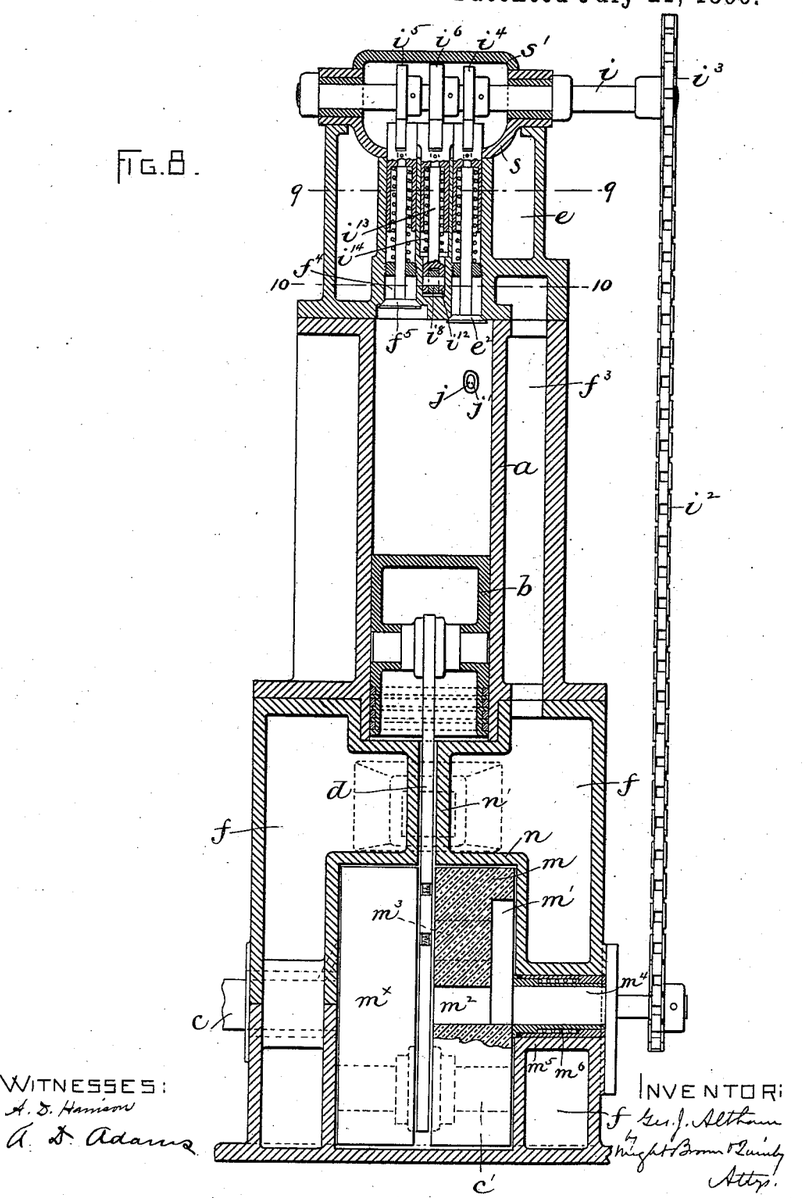
Fig. 8 represents a section on line 8 8 of Fig. 7.

$m$ represents a disk affixed to the shaft $c$, and rotating therewith. Said disk is inclosed in a casing $n$ within the walls of the air-storage chamber $f$, and the upper portion of said casing is connected by a passage $n'$ with the rear end of the cylinder, said passage conducting air from the casing $n$ to the rear end of the cylinder during each return stroke of the piston and from said rear end to the casing during each forward stroke of the piston. The passage $n'$ is formed to surround the connecting-rod $d$, as shown in Figs. 7 and 8. In the outer side of the disk $m$ is a segmental port $m'$, from the ends of which extend passages $m^2 m^3$, communicating with the passage $n'$.

$m^4$ represents a tube movable endwise in a passage $m^5$ in the casing, and pressed by a spring $m^6$ against the outer side of the disk $m$, said tube communicating with the external air, and being arranged to connect with the segmental port $m'$ during a part of the rotation of the disk $m$, the arrangement being such that when the piston is making its return stroke the tube $m^4$ and port $m'$ will register so that air will pass through the said tube, the port $m'$, passages $m^2 m^3$, and passage $n'$ into the rear end of the cylinder. At the end of the return stroke the port $m'$ passes away from the tube $m^4$, the latter being closed by the surface of the disk during the forward stroke of the piston.

Figures 12, 14:
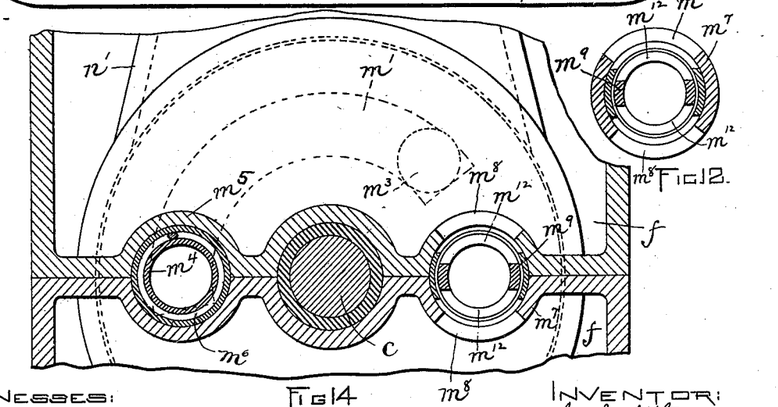
Fig. 12 represents a section on line 12 12 of Fig. 11.
Fig. 14 represents a section on line 14 14 of Fig. 11.
Figure 13:
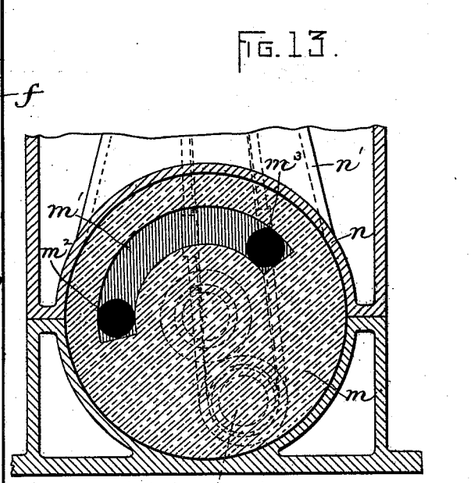
Fig. 13, Sheet 1, represents a section on line 13 13 of Fig. 8.
Figure 15:
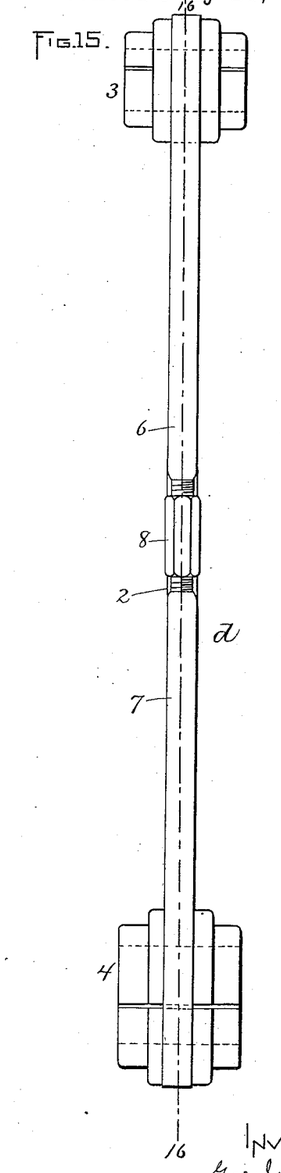
Fig. 15 represents a side view of the connecting-rod.
Figure 16:
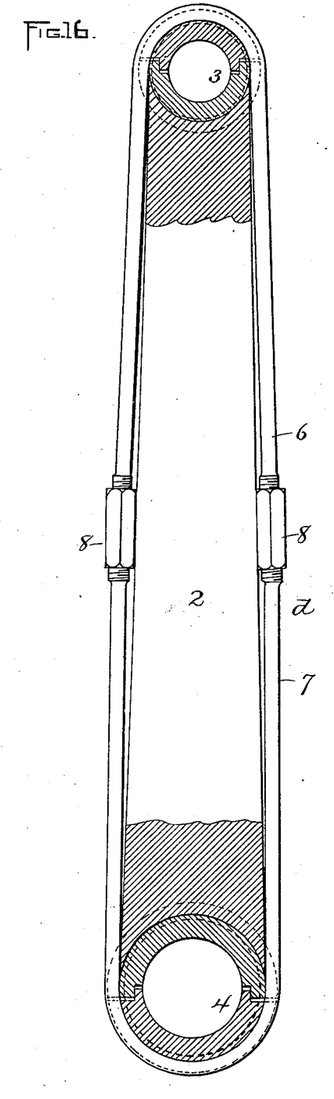
Fig. 16 represents a section on line 16 16 of Fig. 15.

$m^7$ represents a passage extending from the casing $n$ at the opposite side of the shaft from the tube $m^4$, and provided with ports $m^8$ $m^8$, Figs. 12 and 14, communicating with the air-storage chamber $f$. In said passage is a tube $m^9$, which is pressed inwardly by a spring $m^{10}$ against the disk $m$, and has ports $m^{12} m^{12}$, which coincide with the ports $m^8$. The tube $m^9$ is arranged to coincide with the segmental port $m'$ during the forward stroke of the piston, so that the air expelled from the cylinder by the piston passes through the passage $n'$, the disk-passages $m^2 m^3$, the port $m'$, the tube $m^9$, and the ports $m^{12} m^8$ into the air-chamber $f$, the air-inlet tube $m^4$ being at this time closed, as above described. It will be seen, therefore, that the disk $m$ constitutes a positively-operating rotary valve, which connects the rear end of the cylinder with the external air during the return stroke of the piston and with the air-storage chamber during the forward stroke, the operation of the engine being the same as already described. The spring-pressed tubes $m^4$ and $m^9$, bearing closely against the disk $m$, prevent leakage of air between the side of the disk and the casing. This positively-acting valve arrangement is more reliable and positive in its operation than the spring-pressed valves $f^2$ $g^2$, used for the same purpose in the construction first described, the inertia of the said valves causing them to lag and permit an undesirable slip of air, which is avoided by the positive valve. The connecting-rod $d$ is preferably of the adjustable construction shown in Figs. 15 and 16, and comprises the rigid rod 2, the sectional end collars 3 4, one formed to embrace the stud 5, affixed to the piston, while the other embraces the crank-portion $c'$ of the shaft $c$, and the sectional strap composed of the two U-shaped sections 6 7, adjustably connected at their ends by right and left threaded nuts 8 8, said straps embracing the rod 2 and sleeves 3 4, binding the sections of said sleeves together and holding the sleeves in the recessed ends of the rod 2. This construction permits a ready adjustment of the connecting-rod to take up wear, the rotation of the nuts 8 8 in one direction contracting the sectional strap, as will readily be seen. To permit convenient access to said nuts I provide passages $o$ $o$, Fig. 7, extending through opposite walls of the air-chamber $f$ to the passage $n'$. Openings or hand-holes $o'$ $o'$, having removable covers $o^2$ $o^2$, are provided at the inner ends of said passages, so that by adjusting the piston so that the nuts 8 8 come opposite said hand-holes and removing the covers $o^2$ the nuts can be conveniently turned. I utilize the casing $n$ as a receptacle for lubricating-oil, which is admitted through a pipe $p$, Fig. 7, and accumulates in the lower portion of the casing in contact with the disk $m$. In practice, another disk $m^\times$ is affixed to the shaft $c$ besides the disk $m$, the two disks constituting the arms of the crank portion and being separated by a space across which the crank-pin $c'$ extends. Both disks run in the oil which accumulates in the casing, and their rotation raises and distributes the oil, and supplies it not only to the bearings of the shaft $c$ but also to the rear end of the cylinder, the oil being thrown upwardly into the passage $n'$, where it is caught by the upward current of air during the return stroke of the piston, and carried upwardly thereby in a sufficient quantity to lubricate the cylinder and piston and the connection between the connecting-rod and piston.

Figure 10:
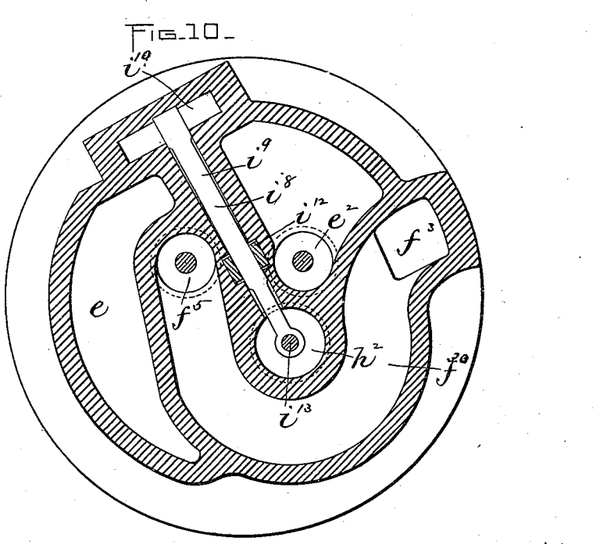
Fig. 10 represents a section on line 10 10 of Fig. 8.
Figure 11:
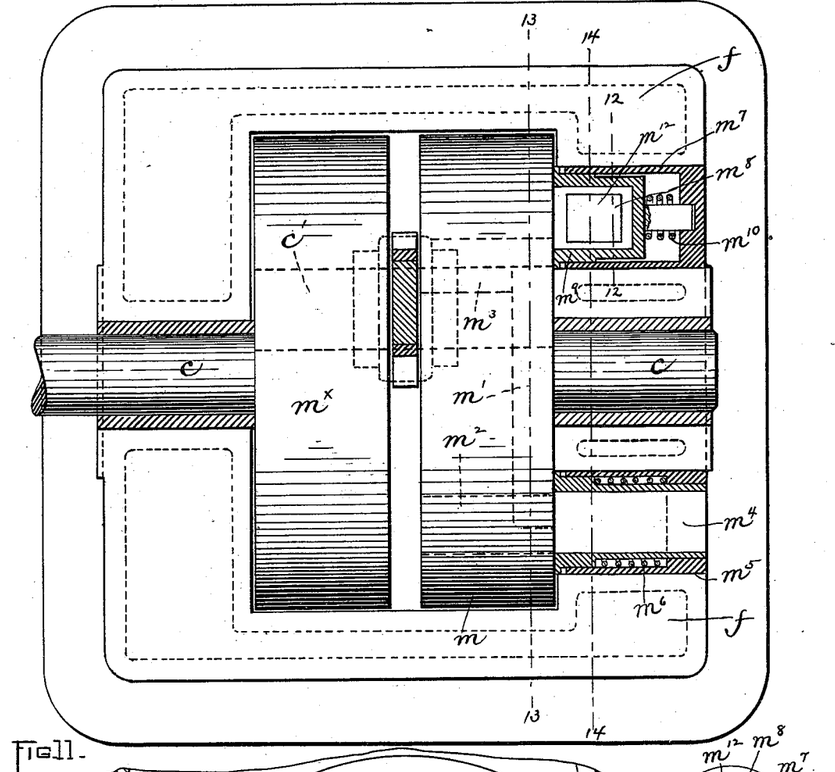
Fig. 11 represents a section on line 11 11 of Fig. 7.

In Figs. 8 and 10 I show the preferred means for preventing the noise that would be caused by leakage of the exhaust products around the stem of the exhaust-valve $h^2$. To this end I connect said valve with a lever $i^8$, which is located in a cavity $i^9$ formed for its reception in the casing or supporting-frame on the front end of the cylinder, said cavity being also formed to contain the fulcrum-pin $i^{10}$ of said lever. The cavity is enlarged between the ends of the lever $i^8$ to receive a fork $i^{12}$, to which the lever is pivoted, said fork being formed on a rod $i^{13}$, which is pressed upwardly by a spring $i^{14}$, so that a trundle-roll on its upper end bears against the cam $i^6$. The cavity fits the fork $i^{12}$ closely, and tightly incloses all parts of the lever $i^8$, so that the exhaust products cannot leak around it at any point. The cams $i^4$ $i^5$ $i^6$ are preferably inclosed in a casing $s$ having a hinged cover $s'$, and containing cotton-waste saturated with oil to lubricate the said cams.

Figure 1:
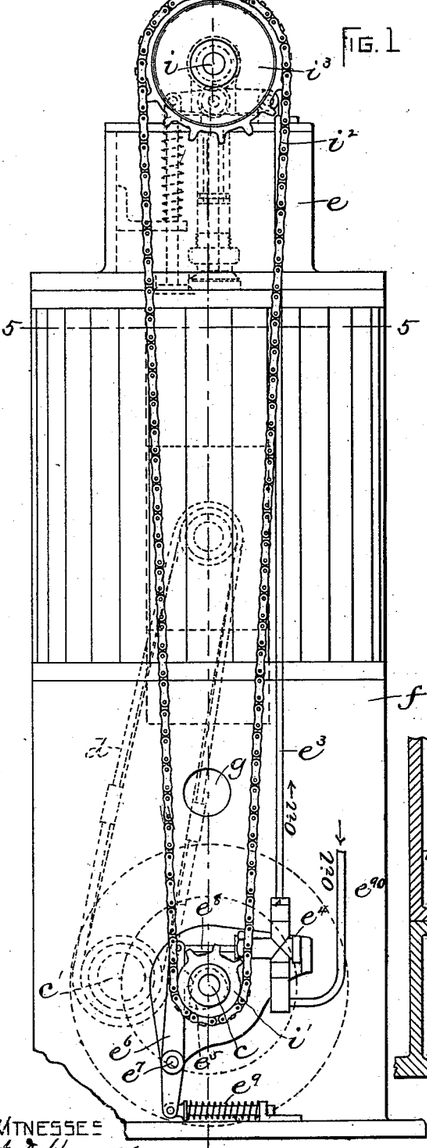
Figure 1 represents a side elevation of one form of oil-engine embodying my invention.
Figure 3:
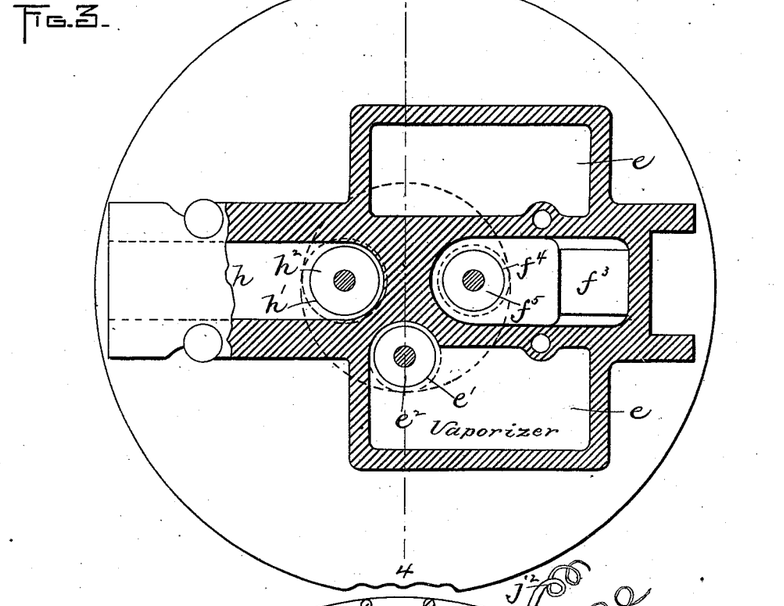
Fig. 3 represents a section on line 3 3 of Fig. 2.
Figure 6:
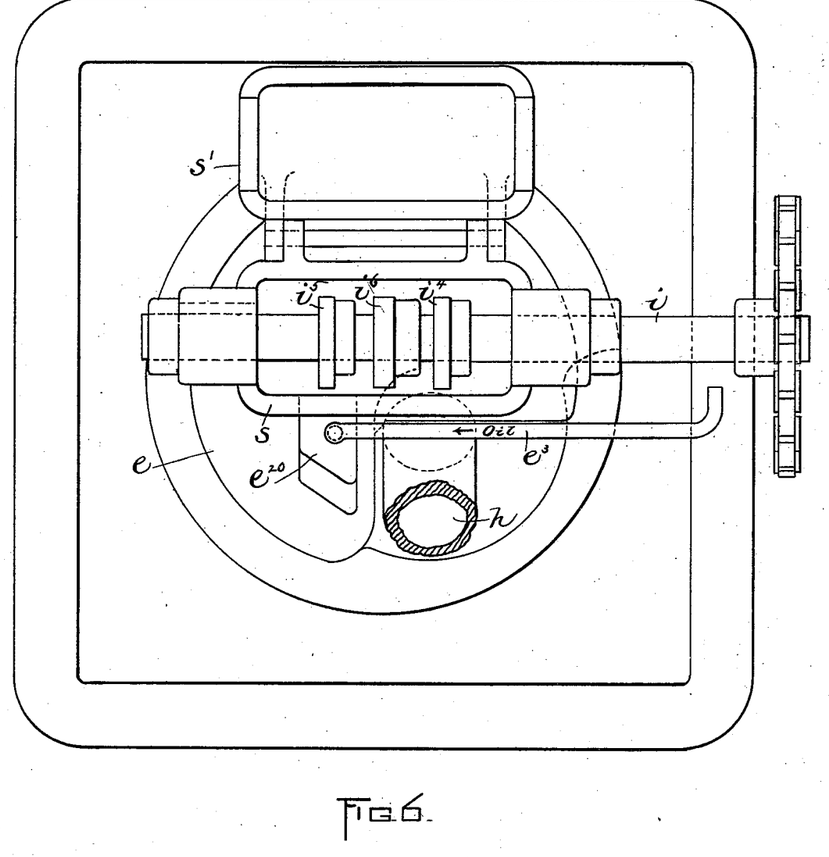
Fig. 6 represents a top view of the preferred construction of an oil-engine embodying my invention.
Figure 9:
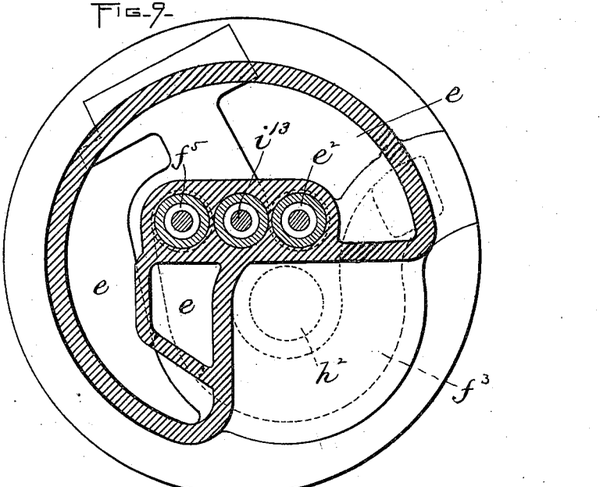
Fig. 9 represents a section on line 9 9 of Fig. 8.

In Figs. 6, 8, and 9 the relative arrangement of the valves $e^2$, $h^2$, and $f^5$, and their operating-cams, is different from that shown in Figs. 1, 2, and 3, the exhaust-valve $h^2$ being arranged as shown particularly in Fig. 10, so that it is partially surrounded by an extension $f^{30}$ of the air-passage $f^3$, which conducts air to the front end of the cylinder, the air being thus caused to cool the exhaust-valve, which is naturally subjected to a high degree of heat. The cam $i^4$, which controls the valve $e^3$, whereby the working charge is admitted, is preferably provided with an adjustable section $i^{40}$, Fig. 4, whereby the cam may be lengthened and shortened, the object being to vary the time of closing the working agent inlet-port during the return stroke of the piston that compresses the charge of the working agent, and correspondingly vary the amount of the charge and the expansion during the next working stroke.

Figure 4:
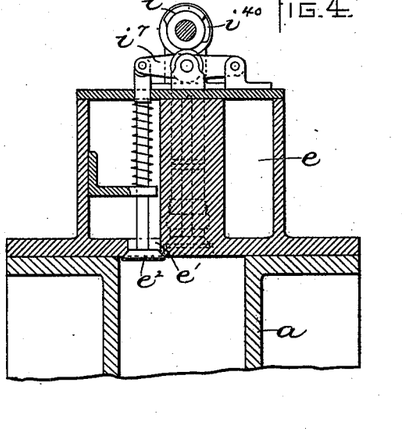
Fig. 4 represents a section on line 4 4 of Fig. 2.

When the cam $i^4$ is in its shortest form, the valve $e^2$ will be closed at the beginning of the charge-compressing return stroke of the piston, but when the cam is lengthened the valve will be held open during a portion of said stroke, so that a part of the charge will be forced back into the vaporizing-chamber, the amount of the charge and the force of the explosion being correspondingly lessened.

I claim—

1. An engine of the character specified comprising a cylinder, a piston working therein, and two independent air-supplying agencies, communicating with the front end of the cylinder, one of said agencies including a vaporizing-chamber, in which the air becomes a part of the working agent, while the other includes first a chamber or reservoir for atmospheric air, secondly means for maintaining an effective pressure of air therein, and thirdly means for intermittently connecting the said chamber with the front end of the cylinder to admit a cleansing blast of air thereto after each working stroke.

2. An engine of the character specified comprising a cylinder, a piston working therein, and two independent air-supplying agencies, communicating with the front end of the cylinder, one of said agencies including a vaporizing-chamber, in which the air becomes a part of the working agent, while the other includes first a valved air-supply inlet for the rear end of the cylinder, secondly an air-storage chamber, thirdly a valved passage connecting the storage-chamber with the rear end of the cylinder, fourthly a valved passage connecting the storage-chamber with the front end of the cylinder and fifthly means for intermittently opening the last-mentioned passage to supply a cleansing and cooling blast to the cylinder after each working stroke.

3. An engine of the character specified comprising a cylinder, a piston working therein, an air-inlet communicating with the rear end of the cylinder to admit air thereto during each return stroke of the piston, an air-storage chamber having an inlet communicating with the rear end of the cylinder, and receiving air therefrom during each forward stroke of the piston, said storage-chamber having an air-outlet communicating with the front end of the cylinder, a rotary valve on the main shaft of the engine controlling the air-inlet at the rear end of the cylinder, and the air-inlet of the storage-chamber, whereby air is permitted to pass from the cylinder to the storage-chamber during the forward movement of the piston, and is prevented from returning from the storage-chamber to the cylinder, and a valve mechanism operated by said shaft to alternately connect the vaporizing-chamber and the air-storage chamber with the front end of the cylinder, and to open the exhaust during the admission of air to the front end of the cylinder.

4. An engine of the character specified comprising a cylinder, a piston therein, a casing below the cylinder surrounding a portion of the main shaft of the engine, said casing being connected with the rear end of the cylinder by a passage which serves to conduct air to and from the rear end of the cylinder, an air-storage chamber communicating with the said passage and with the front end of the cylinder, a rotary valve affixed to the main shaft within said casing, and an air-inlet from the external air to the casing, and an air-outlet from said casing to the air-chamber, both controlled by said valve.

5. An engine of the character specified comprising a cylinder, a piston therein, a casing below the cylinder surrounding a portion of the main shaft of the engine, said casing being connected with the rear end of the cylinder by a passage which serves to conduct air to and from the rear end of the cylinder, an air-storage chamber communicating with the said passage and with the front end of the cylinder, a rotary valve affixed to the main shaft within said casing, an air-inlet from the external air to the casing, an air-outlet from said casing to the air-chamber, both controlled by said valve, and spring-pressed tubes in said inlet and outlet, bearing against the side of the rotary valve.

6. An engine of the character specified comprising a cylinder, a piston therein, a vaporizing-chamber having an outlet communicating with the front end of the cylinder, a valve controlling said outlet and an inlet for the admission of air to form a working agent, an air-chamber having a passage or outlet communicating with the front end of the cylinder and provisions for the alternate maintenance and delivery of an effective cylinder-cleansing blast of air, said provisions including first a valve controlling said air-passage and secondly positively-operating mechanism for opening said valve after each working stroke, holding it open during the following return stroke and closing it during the other strokes of the cycle, an exhaust-passage communicating with the front end of the cylinder, a valve controlling said exhaust-passage, mechanism for operating the exhaust-valve and the working-agent valve alternately, the exhaust-valve being opened and closed practically in unison with the air-valve to permit the cleansing action of the blast of air released by the opening of the air-valve, and to close the exhaust during the other strokes of the cycle, while the working-agent valve is opened during the forward stroke following the cleansing action and closed during the other strokes of the cycle to coöperate with the other valves in causing the compression of the working agent by the return stroke following its admission, and thereafter to exclude the working agent from the cylinder, and means for igniting the working agent after its compression, whereby a working stroke is obtained at each alternate forward movement of the piston.

7. An engine of the character specified comprising a cylinder, a piston working therein, a vaporizing-chamber having an inlet communicating with the external air and a working-agent outlet communicating with the front end of the cylinder, an air-storage chamber having an inlet communicating with the rear end of the cylinder and an outlet communicating with the front end of the cylinder, an air-supply inlet independent of said chamber communicating with the rear end of the cylinder, an exhaust-passage communicating with the front end of the cylinder, valve mechanism controlling the inlet to the air-chamber from the cylinder and the said supply-inlet at the rear end of the cylinder, whereby each forward stroke of the piston is caused to compress and store air in the storage-chamber under an effective pressure, valve mechanism controlling the outlet of the storage-chamber and organized to release a blast of the compressed air into the front end of the cylinder at predetermined periods, valve mechanism for opening and closing the exhaust-passage practically in unison with the air-chamber outlet, and valve mechanism for opening and closing the working-agent outlet alternately with the air-chamber outlet, whereby the piston is caused at every forward stroke following the cleansing blast, to draw a charge of vapor and air from the vaporizing-chamber and to compress said charge at the following return stroke.

8. An engine of the character specified having an exhaust-passage, a valve therefor, a valve-controlling lever inclosed in a cavity in the cylinder-head and pivotally connected therewith at one end, and a rod connected with said lever between its ends and extending through the wall of the cavity to an operating device.

In testimony whereof I have signed my name to this specification, in the presence of two subscribing witnesses, this 21st day of January, A. D. 1896.

GEORGE J. ALTHAM.

Witnesses:
W. W. COE,
C. F. BROWN.